UNITED STATES PATENT OFFICE.

DEXTER REYNOLDS, OF ALBANY, NEW YORK.

PROCESS OF REDUCING MAGNETIC OXIDE-OF-IRON ORES.

SPECIFICATION forming part of Letters Patent No. 335,624, dated February 9, 1886.

Application filed September 19, 1884. Serial No. 143,510. (No specimens.)

*To all whom it may concern:*

Be it known that I, DEXTER REYNOLDS, a citizen of the United States, residing in the city and county of Albany, and State of New York, have invented certain new and useful Improvements in Processes of Reducing Magnetic Oxide-of-Iron Ores and Sands for Producing Iron and Steel Direct from the Same; and I declare that the following is a full, clear, and exact description of the invention, which will enable others skilled in the art to which it appertains to make and use the same.

My improvement relates to the manufacture of iron and steel by treating as pure oxide of iron as can be obtained by mechanically freeing it from all foreign matters associated with it in magnetic iron ores or natural magnetic iron sands, so as to obviate the use of fluxes, which are less effective and economical therefor, and which, being poor conductors of heat and adding greatly to the bulk of the mass to be treated, increase the size of the furnace and the amount of fuel required; or where fluxes are not employed and these foreign matters left in, adding to the labor of puddling and tending to waste the metal and impair its tensile strength, effecting the deoxidation and due carbonization and reduction of the iron without the use (as an admixture or fuel) of any solid carbonaceous substance, for where charcoal is used it is very expensive, and coal or coke containing, impart sulphur and phosphorus to and injure the quality of the metal, while all contain from two to over ten per cent. of ash. As sufficiently pure oxide of iron can only be had by separation from the natural magnetic iron sands, or magnetic oxide-of-iron ores crushed to as fine a state, the resultant fine particles cannot be used to advantage in a Catalan forge with charcoal, as the strong blast required wastes it by carrying much of it up the stack, nor can it be used in a cupola-furnace, owing to its packing. Heretofore, therefore, it has been deoxidized by mixing it with crushed charcoal, coal, or coke, (with the disadvantages before named,) and placed in retorts or receptacles and subjected to the waste heat of a puddling-furnace, or the mixture has been compressed into forms and subjected to the direct action of the heat of a furnace, as by De Puy and others.

My process has for its purpose, however, to deoxidize, carbonize, and reduce the metal to a welding or fused state without fluxes or any solid carbonaceous matter as an admixture or fuel, and solely from and by the vapor of petroleum used as the heating-fuel, by spreading it out in a thin layer on the bed of a suitable furnace and subjecting it to the action of the ignited vapor of petroleum with air not under a strong blast, but so regulated in amount as to produce a deoxidizing, oxidizing, or neutral flame, as may be necessary from time to time in the progress of deoxidation and carbonization of the metal and its reduction to a pasty state for balling and making into blooms or reduction to a fused state for pouring and making ingots of low-carbon iron or steel.

To carry my invention into effect, I take magnetic oxide-of-iron ore as free from sulphur or phosphorus as can be readily obtained, and by means of any well-known or suitable ore-crushing machinery or apparatus reduce the same to a fine granular condition, in which the oxide of iron and a large per cent. of the foreign substances contained in the ore will be loosened from each other. I then subject this crushed and finely-granulated ore to the action of any suitable washing machine or apparatus, so that by the agitation of the particles of oxide of iron and foreign substances with each other at the same time the water is acting on the adhering soluble and removable substances, clay and other light adhering or soluble matter will be entirely removed from both the pure oxide-of-iron particles and the heavier foreign substances, leaving the latter loosened and separated from, although associated with, the former. I then subject the resultant product of this water separation to the action of a magnetic separator, and remove the oxide-of-iron particles from the remaining foreign substances.

Where it is proposed to obtain the oxide of iron from natural magnetic iron sands, (which are usually free from sulphur and exceptionally low in phosphorus,) as they are already in a very fine state and thoroughly washed, magnetic separation alone is necessary. It will be found that this resultant purified oxide of iron, with care, can thus be brought so as to be associated with less than one per cent. of foreign substances not chemically combined with it, and to be so pure that the use of any flux will be wholly unnecessary. This resultant purified granular oxide of iron is then, without any admixture of either carbonaceous matter or fluxes, spread out on the bed of a suitable furnace (the preferred kind of which will be hereinafter described) in a thin layer of a uniform depth of about three inches, and subjected to the action of the flame of the ignited vapor or gases of petroleum, burning with a regulated amount of air, and having a passage over and in close contact with the surface of this thin layer of oxide of iron from one end thereof to the other.

The amount of air at first admitted to support the combustion of the petroleum vapor or gas over and in contact with the oxide of iron is preferred to be of such a proportion with the carbon in the same as to produce for a short time the best heating flame, so as to most quickly and economically heat and bring the mass of oxide of iron in the full extension of its layer to a state in which the oxygen with the iron will most readily unite with the carbon and hydrogen of such flame, and then the proportion of air admitted should be diminished or vapor of petroleum increased and so adjusted as to produce a deoxidizing-flame which will be suitable in character not only to keep up the temperature of the iron, but to have an excess of carbon and hydrogen to combine with the oxygen with the iron and so withdraw such oxygen therefrom and bring the oxide of iron to a metallic state by the otherwise unconsumed carbon or hydrogen, or both, in such flame. This deoxidizing-flame should then be continued until the oxygen has been wholly taken up from the iron, and while being thus treated this mass of oxide of iron should be stirred from time to time, as may be required, to bring the lowermost particles of the same uppermost for being directly acted on by the flame, while the wholly deoxidized or metallic, and consequently heavier, particles of pure iron will sink below and out of contact with this deoxidizing-flame. When all portions of this layer of purified oxide of iron have been deoxidized as above described, I still continue such deoxidizing-flame, then acting as a carbonizing one, in contact with the mass, and with frequent stirring of the latter for a length of time sufficient to impart to the metal the requisite amount of carbon for making malleable iron or steel, as desired. The flame is then changed by the admission of a proper quantity of air, so as to become neutral in character, and is so continued until the metal is brought to a suitable state for balling and making blooms. If ingots of low-carbon iron or steel are to be produced, this neutral flame should be continued and intensified until the metal is brought to a molten state suitable to be run into molds.

The regulation of the supply of air or of vapor or gas, and thus the character and intensity of flame most suitable to be from time to time employed, can be best determined by observation and practice.

The form of construction of the furnace preferred by me for the purpose of carrying into effect this invention is that of one single oblong chamber about sixteen feet inside length and about six feet inside width, with a floor or bed having an equal horizontal extension, and inclined toward the center for the flow of the metal thereto, and with provision for tapping off the metal, if desired, so that with a layer of a depth of about three inches of oxide of iron spread uniformly over the floor there will be sufficient capacity for treating a sufficient amount of the oxide of iron at each charge as to produce a gross ton of metal. Should the furnace be for a less capacity, I would in preference reduce its width, leaving the length unaltered, so that the travel of the flame over the material shall be as long as practicable. This furnace I prefer to make of suitable brick-work and with arched roof, and with proper openings at the sides for the introduction of the oxide of iron and convenient access to the interior for stirring the same, and for the operations of balling, drawing off, or other necessary manipulations. At one of the ends of this furnace there should be orifices arranged to admit to the interior of the furnace the vapor of petroleum as produced and supplied by a series of Leffert's hydrocarbon-burners, patented December 4, 1883, or any other suitable burners for burning petroleum, with devices for regulating the supply of air to be admitted therewith, so as to produce the several characteristic flames above mentioned as they may be required, and at the opposite end should be made an oblong draft-opening to the stack or exit-flue, by which the flames will be drawn over and upon the whole length of the layer of oxide of iron on the bed of the furnace-chamber. The air employed for supplying the furnace can be cold or heated.

Other forms of furnace may be employed for carrying into effect this invention, as it is not limited to any particular form of chamber room, so long as a single chamber provided with the necessary openings and with sufficient capacity of floor or bed is employed for receiving in a single charge the thin layer of purified finely-reduced oxide of iron intended to be treated.

Besides the advantages of economy in space and fuel and the avoidance of ash and impurities—as sulphur and phosphorus, heretofore mentioned—it may be added that the oxide of iron so procured, being unexceptionably pure and uniform, and the actual metal in a given weight thereof, therefore well known, and as the carbon and hydrogen in each gallon of petroleum is also well known, and its consumption capable of being accurately measured, regulated, and noted, the deoxidizing and carbonizing effect of a given amount of petroleum used in vapor can be definitely determined, so that ingots of malleable iron or even true steel of the finest quality and of any desired percentage of carbon can be produced with uniformity and certainty.

My improvement is distinguished from every other previous process for the manufacture of iron and steel, among others in some one or more of the following substantial particulars: First, in the non-use of any flux whatever; second, in the non-use of any solid carbonaceous material whatever; third, in deoxidizing, carbonizing, and reducing the metal to a welding or a fused state solely by the action of the heating-fuel.

I am aware of English Patents No. 658 of 1854, No. 2,413 of 1866, No. 2,484 of 1867, No. 3,077 of 1871, and United States Patents No. 95,295, of September 28, 1869, and No. 121,877, of December 12, 1871; but they all used fluxes, and I do not.

I am also aware of United States Patents No. 4,526, of May 16, 1846, and No. 4,103, of July 5, 1845; but they both, as well as English Patent No. 3,077 of 1871, used solid carbonaceous materials, and I do not.

I am also aware of United States patent to G. H. Smith, No. 92,894, of July 20, 1869; but he did not deoxidize, carbonize, and reduce or fuse solely with the heating-fuel. The same may be said of English Patent No. 2,484 of 1867, of Siemens, before mentioned.

I am also aware that the procuring of oxide of iron for the manufacture therefrom of iron and steel by separating it from magnetic oxide-of-iron ores and the natural magnetic iron sands magnetically and otherwise is old, and that English Patents No. 1,458 of 1856, and Nos. 39 and 1,863 of 1857, as well as patents to Edison and others, have been issued therefor in this and other countries; but I am not aware that iron or steel have ever heretofore been made from oxide of iron separated from magnetic iron ores or from the natural magnetic iron sands, or from such ores or sands themselves, without the use of any flux or any solid carbonaceous material as an admixture or fuel, and solely by the action of the heating-fuel.

Having described my invention, what I claim, and desire to secure by Letters Patent, is—

The process above described of deoxidizing magnetic oxide-of-iron ores and magnetic iron sands and carbonizing and reducing to a pasty or fused state the metal so produced without the admixture with solid carbonaceous substances or fluxes, which consists in subjecting in a suitable chamber an extensive but thin layer of the above-described fine-granulated pure oxide-of-iron particles, mechanically separated from such ores or sands, to the action of the vapor or gases of petroleum burned with timely and suitably-adjusted measures of air, as above described, passed over, upon, and in contact with the upper exposed surface of the thin layer thereof, occasionally stirred, all substantially as and for the purposes set forth.

DEXTER REYNOLDS.

Witnesses:
    CHARLES SELKIRK,
    ALEX. SELKIRK, Jr.